United States Patent [19]

Lehto

[11] Patent Number: 5,443,609
[45] Date of Patent: Aug. 22, 1995

[54] BENDING AND TEMPERING STATION FOR GLASS SHEETS

[75] Inventor: Esko Lehto, Kangasala, Finland

[73] Assignee: Tamglass Engineering Oy, Tampere, Finland

[21] Appl. No.: 240,614

[22] Filed: May 11, 1994

[30] Foreign Application Priority Data

Apr. 26, 1994 [FI] Finland .................. 941931

[51] Int. Cl.$^6$ ................ C03B 23/023; C03B 27/00
[52] U.S. Cl. ........................ 65/268; 65/273; 65/104
[58] Field of Search .......... 65/104, 268, 273

[56] References Cited

U.S. PATENT DOCUMENTS 4,586,946 5/1986 Kramer et al. ............ 65/273
4,822,398 4/1989 McMaster et al. .
4,881,962 11/1989 Reunamäki et al. .
5,009,693 4/1991 Freidel et al. ............ 65/273
5,057,137 10/1991 Reunamäki et al. .

Primary Examiner—W. Gary Jones
Assistant Examiner—Steven P. Griffin
Attorney, Agent, or Firm—Burns, Doane, Swecker & Mathis

[57] ABSTRACT

The invention relates to a bending and tempering station for glass sheets, comprising an archable roll conveyor and upper and lower tempering boxes (5, 7) provided with tempering orifices (8, 6). The upper tempering boxes (7) are fitted with a number of press rollers (11) having a top rest position and a bottom working position. The rollers (11) are capable of moving against the force of a pneumatic spring (17) from the working position towards the rest position. The pneumatic spring (17) can be further used for operating the rollers (11) between the working position and the rest position.

10 Claims, 2 Drawing Sheets

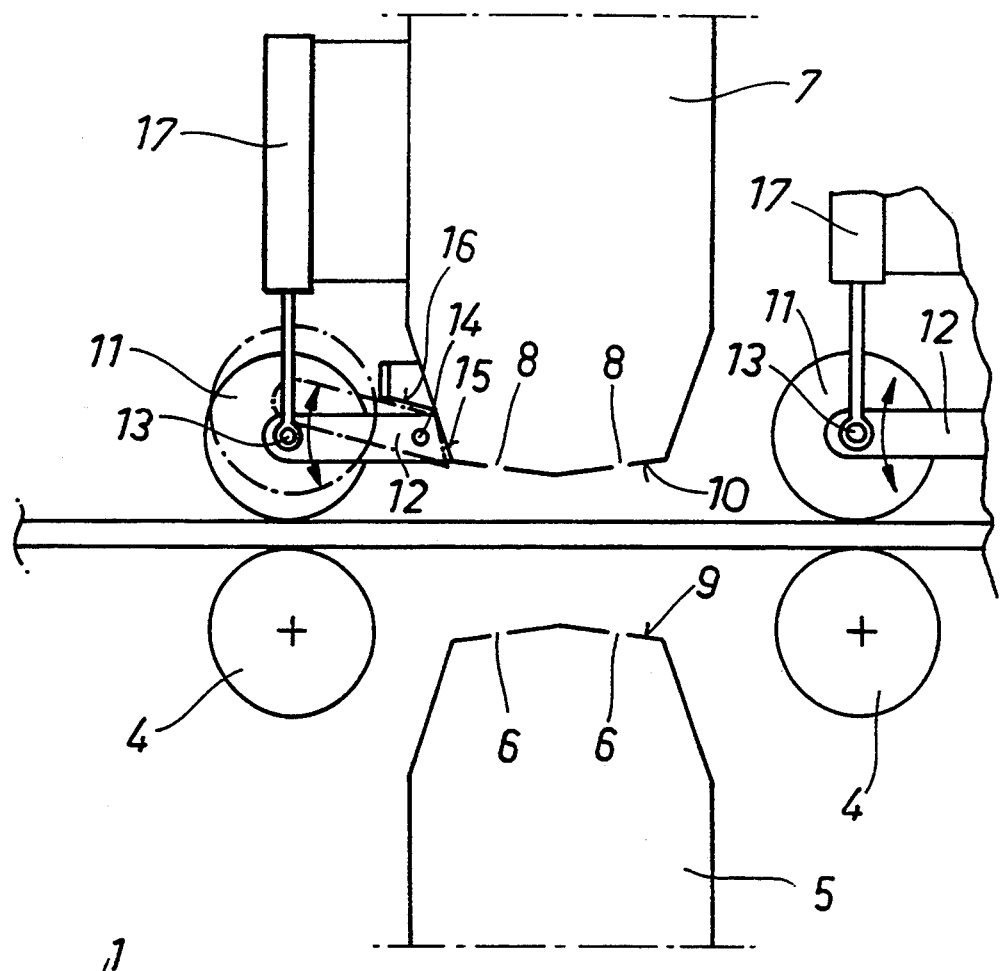
Fig. 1
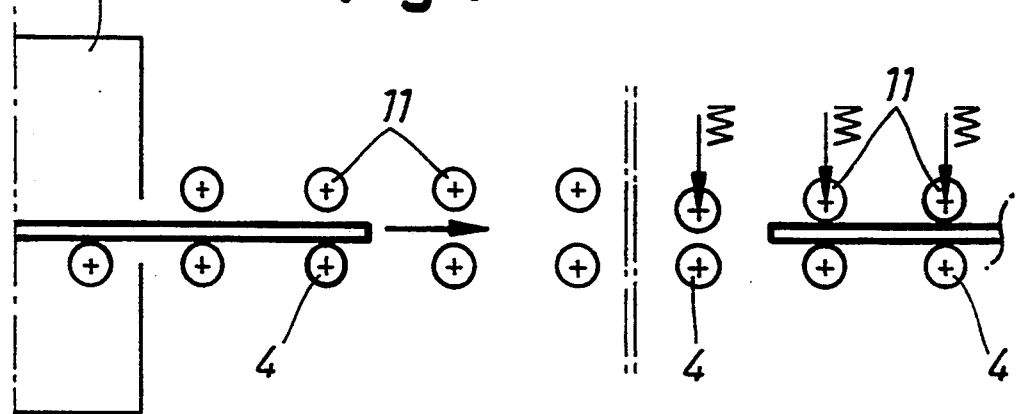
Fig. 2A  Fig. 2B

BENDING AND TEMPERING STATION FOR GLASS SHEETS

BACKGROUND AND SUMMARY

The present invention relates to a bending and tempering station for glass sheets, comprising a roll conveyor in which the relative vertical position of rolls is adjustable for arching the conveyor to a curvature corresponding to a desired degree of bending about a bending axis extending transversely to the glass sheet advancing direction i.e. parallel to the rolls, lower tempering boxes having top surfaces provided with tempering orifices, and upper tempering boxes having bottom surfaces provided with tempering orifices, said tempering boxes being movable for bringing said top and bottom surfaces in conformity to the arching of the conveyor. This type of apparatus is prior known from the U.S. Pat. Nos. 4,881,962 and No. 5,057,137. This apparatus has proved extremely useful in the production of bent and tempered construction glass.

In this prior known apparatus, the bending of a glass sheet is based on gravitational bending in a bending and tempering station located outside a heating furnace. Therefore, it is sometimes necessary to overheat the glass relative to a required tempering temperature since the glass temperature falls before the glass has completely bent to its desired configuration and the glass tempering can be commenced.

Depending on the glass types as well as conditions, the cooling of glass is typically in the order of 10° C.–25° C.

A characterizing feature for this so-called overheating is that the optical errors of glass are accentuated and are more perceivable in the end product.

An object of the invention is to improve the above prior known apparatus in a manner that such detrimental overheating can be omitted thus decreasing the temperature of a glass sheet coming out of a furnace and improving the glass optics.

This object is achieved by means of the invention on the basis of the characterizing features described below.

When, according to the invention, adjustable press rollers are provided above a glass sheet, the gravitational bending is replaced by mechanical press bending, whereby the above object of the invention will be achieved and, furthermore, the accuracy of a glass sheet bending shape will be improved as the bending can be controlled and forced to a desired shape or configuration.

The bending of a piece of glass with a set of upper and lower rollers in a combined bending and tempering station has already been proposed in U.S. Pat. No. 4,822,398. In that publication, however, the bending is effected about a bending axis extending in the glass sheet advancing direction, whereby the rollers abutting both surfaces of a glass sheet during the course of bending travel laterally relative to the glass, i.e. glide along the glass surface in the direction transverse to the advancing direction. This makes it difficult to fulfill the requirement for high optical quality. The present invention relates principally to the bending about an axis extending transversely to the advancing direction. The resilient suspension of press rollers and the pressing force adjustable during the course of bending enable the adaption of the invention also to such benders in which the bending is effected about an axis extending in the advancing direction.

BRIEF DESCRIPTION OF THE DRAWING FIGURES

One embodiment for working the invention will now be described in more detail with reference made to the accompanying drawings, in which FIG. 1 is a side view showing a portion of a bending and tempering station;

FIG. 2A shows schematically the transfer of a glass sheet from a furnace into a bending and tempering station and FIG. 2B shows schematically the position of rolls and rollers after transferring a glass sheet into a bending and tempering station;

DETAILED DESCRIPTION

Figure 3:
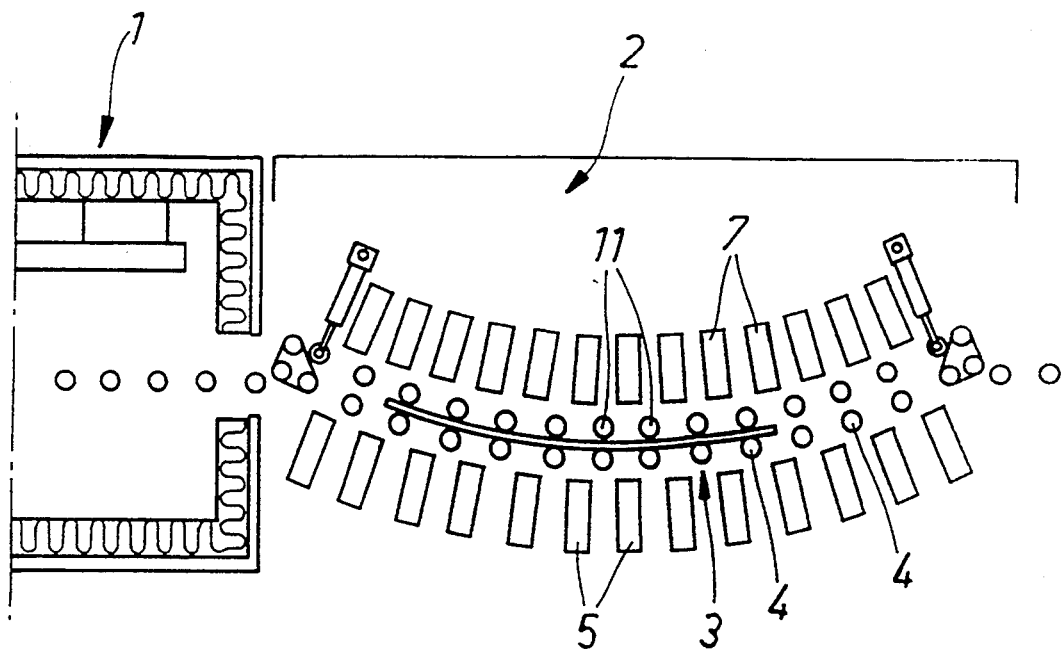
FIG. 3 is a schematic side view of a bending and tempering station during the course of bending.

Downstream of a furnace 1 lies a bending and tempering station 2 provided with a conveyor 3 consisting of rollers 4. Below a glass sheet carried by the rollers 4 are tempering boxes 5 and thereabove are tempering boxes 7. The tempering boxes 5 have top surfaces 9 provided with nozzle orifices 6 and the tempering boxes 7 have bottom surfaces 10 provided with nozzle orifices 8. Nozzles enclosed in the tempering boxes 5 and 7 are not shown and the design and configuration thereof can be varied in many ways.

As disclosed in more detail in U.S. Pat. No. 4,881,962 and U.S. Pat. No. 5,057,137, the conveyor 3 can be arched to a curvature corresponding to a degree of bending desired for the glass. This can be effected by any mechanism capable of moving the rollers 4 relative to each other in vertical direction. The nozzle boxes 5 and 7 are adapted to be movable in a corresponding manner, such that the upper and lower array of boxes have a curvature matching that of the conveyor 3. Thus, the box surfaces 9 and 10 maintain essentially the same distance from the glass surface, whereby the glass sheets can be tempered effectively and uniformly irrespective of their degree of bending.

The upper tempering boxes 7 are fitted with a number of press rollers 11 adapted to be movable by means of a pneumatic cylinder 17 between an upper rest position and a lower working position. The axially short and lightweight rollers 11 are journalled onto a stub axle 13 which is fastened to the end of the piston rod of cylinder 17. Linked to the axle 13 is also a swinging arm 12 limiting the vertical movement of said axle 13. The swinging arm 12 is fastened by means of a hinge pin 14 to a lug included in the side surface of box 7. Limiting abutments 15 and 16 define the boundaries for the swinging motion of arm 12. The bottom position limiting abutment 15 is preferably adjustable. In the bottom position, the bottom surface of roller 11 is typically at a distance of 2–3 mm from the plane defined by the top surface of rolls 4. The roller 11 may have a fixed top position, e.g. 8–10 mm from the plane defined by the top surface of rolls 4.

The adjustment of the air pressure of pneumatic cylinder 17 can be used for achieving a desired pressing force for promoting the glass bending. If desired, the pressing force can also be adjusted during the course of bending. The pneumatic cylinder 17 has a diameter of e.g. 8–10 mm and a length which preferably approximately 5 times the diameter for providing a suitable resilience. The simultaneous control of all pneumatic cylinders 17 can be used for operating all rollers 11 simultaneously between said top and bottom end positions.

As shown in FIG. 2A, upon the arrival of a glass sheet in the bending and tempering station, the press wheels 11 are in their top position slightly off the glass surface or they can also be in a light contact therewith. When the glass is completely inside the bending station (FIG. 2B), the bending commences. The press wheels 11 are simultaneously provided with a desired and adjustable down-force forcing the glass to conform to the rollers 4 of the flexing conveyor. However, the glass reciprocates in an oscillating fashion during the course of bending. In the illustrated case, the press rollers 11 and conveyor rollers 4 are on top of each other and, in the bottom position of rollers 11, the distance therebetween is slightly less than the thickness of a glass sheet to be bent. When the leading edge of a glass sheet arrives between roll 4 and rollers 11, the rollers shift a small distance upwards against the force of the pneumatic spring 17.

FIG. 3 illustrates a situation in which the glass has reached a certain degree of bending. Upon reaching the final degree of bending, the tempering blast is commenced while the glass continues oscillation between rollers 4 and rollers 11. As the tempering operation is finished, the upper press rollers 11 are lifted and returned to their top position. Thus, the bottom position of rollers 11 is a working position and the top position is a rest position.

Figure 4:
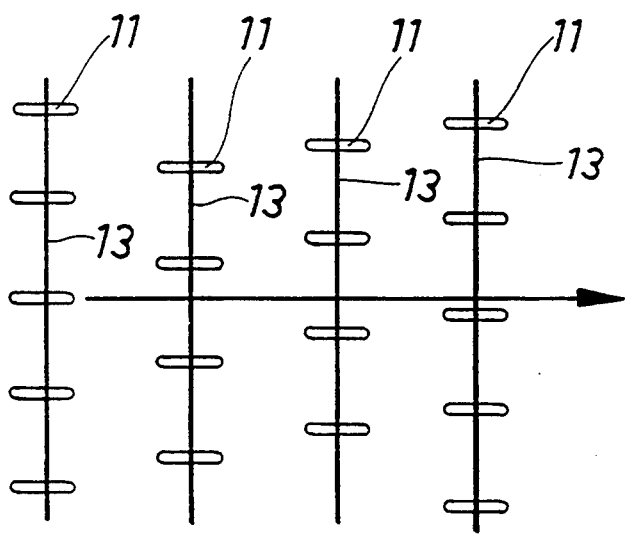
FIG. 4 is a plan view showing the disposition of press rollers.

FIG. 4 illustrates the disposition of press rollers, selected so as not to form successive rows relative to the glass advancing direction. The press wheels are structurally light and well journalled for free rotation. The wheels are provided e.g. with plastic bodies and on their peripheries with a fibrous coating of a material temporarily resistant to a high temperature (about 630° C.). The coating material can be any material used in roller coatings.

The resilient suspension and adjustable pressing force of rollers provide an essential advantage over conventional benders in which the roller axles are fixedly connected to tempering boxes.

The invention is not limited to the above exemplary embodiment but its structural details can be varied in many ways. For example, the pneumatic spring 17 can be replaced with other types of springs. Also the restriction of the movement of rollers 11 to a top and bottom position can be provided in a plurality of ways. The press rollers or wheels need not necessarily be suspended directly to nozzle boxes 7 but the suspension can be indirect. One and the same horizontal axle 13 can also be used for journalling a plurality of press wheels 11 supported by one or more pneumatic springs 17.

I claim:

1. A bending and tempering station for glass sheets, comprising:
   a roll conveyor comprising a plurality of conveyor rollers having means for adjusting a relative vertical position of the conveyor rollers for arching the conveyor to a curvature corresponding to a desired degree of bending;
   lower tempering boxes having top surfaces provided with tempering orifices positioned below the conveyor; and
   upper tempering boxes having bottom surfaces provided with tempering orifices positioned above the conveyor;
   wherein the upper and lower tempering boxes are movable relative to the conveyor to maintain said top and bottom surfaces a constant distance from the conveyor;
   a plurality of press rollers movably mounted on the upper tempering boxes having a top rest position and a bottom working position;
   spring force means for biasing each press roller in the working position; and
   wherein the press rollers are movable from the bottom working position to the top rest position against the spring force means.

2. A bending and tempering station as set forth in claim 1, wherein said spring force means is a pneumatic spring.

3. A bending and tempering station as set forth in claim 2, wherein said pneumatic spring is a pneumatic cylinder, which selectively operates to move simultaneously the press roller between the rest position and the working position.

4. A bending and tempering station as set forth in claim 1, wherein in the working position the distance from a lowest point of the press roller to a conveying level defined by a highest point of the conveyor rollers is in a range of 2–3 mm and in the rest position the distance is in a range of 8–10 mm, when the tempering boxes are moved to a tempering position.

5. A bending and tempering station as claimed in claim 4, further comprising means for controlling the movement of the press rollers for shifting from the rest position to the working position after a glass sheet to be bent has arrived from a furnace onto the conveyor and below the press rollers.

6. A bending and tempering station as set forth in claim 1, further comprising means for controlling the movement of the press rollers for shifting from the rest position to the working position after a glass sheet to be bent has arrived from a furnace onto the conveyor and below the press rollers.

7. A bending and tempering station as set forth in claim 1, wherein the plurality of press rollers are mounted on a common horizontal axle which is connected for vertically reciprocating movement to a pneumatic cylinder.

8. A bending a tempering station as set forth in claim 1, wherein each press roller is mounted on a swinging arm, and further comprising movement limiting abutments mounted on the upper tempering box to limit the motion of said swinging arm and to define the working position and the rest position for the press rollers.

9. A bending and tempering station for glass sheets, comprising:
   a roll conveyor comprising a plurality of conveyor rollers having means for adjusting a relative vertical position of the conveyor rollers for arching the conveyor to a curvature corresponding to a desired degree of bending;
   lower tempering boxes each having a top surface provided with tempering orifices positioned below the conveyor; and
   upper tempering boxes each having a bottom surface provided with tempering orifices positioned above the conveyor;
   wherein the upper and lower tempering boxes are movable relative to the conveyor to maintain said top and bottom surfaces a constant distance from the conveyor;

a plurality of press rollers mounted on the upper tempering boxes and resiliently biased by biasing means in a lower working position, wherein each press roller is movable from the working position upward toward the upper tempering box.

10. A bending and tempering station as set forth in claim 9, wherein said biasing means is a pneumatic spring.

* * * * *